( 12 ) United States Patent
Okita et al.

(10) Patent No.: US 8,428,765 B2
(45) Date of Patent: Apr. 23, 2013

(54) PROCESS INTEGRATION DETERMINING SYSTEM AND METHOD

(75) Inventors: Toshiyuki Okita, Nishio (JP); Yoshimasa Kuwano, Aichi-gun (JP); Kazunari Teramoto, Aichi-gun (JP)

(73) Assignee: JTEKT Corporation, Osaka-shi (JP)

( * ) Notice: Subject to any disclaimer, the term of this patent is extended or adjusted under 35 U.S.C. 154(b) by 343 days.

(21) Appl. No.: 12/820,321

(22) Filed: Jun. 22, 2010

(65) Prior Publication Data

US 2010/0324714 A1    Dec. 23, 2010

(30) Foreign Application Priority Data

Jun. 22, 2009  (JP) ................................ 2009-147831

(51) Int. Cl.
*G06F 19/00*    (2011.01)

(52) U.S. Cl.
USPC ........... 700/179; 700/171; 700/173; 700/174; 700/182; 700/183; 700/184; 700/185; 700/186; 700/187

(58) Field of Classification Search .................. 700/179, 700/182–187, 171, 173, 174
See application file for complete search history.

(56) References Cited

U.S. PATENT DOCUMENTS

| | | | | |
|---|---|---|---|---|
| 4,884,373 A * | 12/1989 | Suzuki et al. ..................... 451/5 |
| 5,285,579 A * | 2/1994 | Armando ........................ 33/18.1 |
| 5,378,091 A * | 1/1995 | Nakamura ..................... 409/132 |
| 5,495,430 A * | 2/1996 | Matsunari et al. ................. 703/6 |
| 5,796,618 A * | 8/1998 | Maeda et al. ................... 700/182 |
| 5,808,893 A * | 9/1998 | Pugh et al. ..................... 700/193 |
| 5,917,726 A * | 6/1999 | Pryor .............................. 700/95 |
| 5,919,012 A * | 7/1999 | Nakagawa et al. ............ 409/132 |
| 5,933,353 A * | 8/1999 | Abriam et al. ................. 700/182 |
| 2003/0023341 A1* | 1/2003 | Sagawa et al. ................. 700/159 |
| 2004/0186614 A1* | 9/2004 | Yamaguchi et al. ........... 700/179 |
| 2010/0036519 A1 | 2/2010 | Yamada et al. |

FOREIGN PATENT DOCUMENTS

JP        11-235646          8/1999

OTHER PUBLICATIONS

Yamazaki et al.,"Automous Process Planning with Real-Time Machining for Productive Sculptured Surface Manufacturing Based on Automatic Sculputured Surface Manufacturing Based on Automatic Recognition of Geometric Features", 1995, University of Keio, Yokohama, Japan, 6 pages.*
Shaw et al., "Manufacturing Planning and Predictive Process Model Integration using Software Agents", 2005, Elsevier, p. 135-142.*
U.S. Appl. No. 12/820,282, filed Jun. 22, 2010, Okita, et al.
Office Action mailed Feb. 5, 2013, in Japanese Patent Application No. 2009-147831, filed Jun. 22, 2009, pp. 1-4. (w/English translation).

* cited by examiner

*Primary Examiner* — Jeffrey A Gaffin
*Assistant Examiner* — Thomas Stevens
(74) *Attorney, Agent, or Firm* — Oblon, Spivak, McClelland, Maier & Neustadt, L.L.P.

(57) ABSTRACT

An optimal process determining system executes a step of calculating a temporary process that includes information of a plurality of individual processes. According to an example, each process includes a tooling including of a tool, a holder, a tool projection length, and a sequence of the plurality of individual processes. A similarity between the toolings of two individual processes is calculated. In addition, a calculation is performed relating to a plurality of integrated processes for which the tooling of one of the individual processes having a high similarity is integrated into the tooling of the other one of the individual processes. In addition, an optimal process is determined from the plurality of integrated processes on the basis of an actual machining time in each of the integrated processes, a unit integration reduction time reduced as one of the toolings of the individual processes is integrated, and the number of the individual processes integrated.

7 Claims, 13 Drawing Sheets

| HIGH MACHINING EFFICIENCY | | INTERMEDIATE MACHINING EFFICIENCY | | LOW MACHINING EFFICIENCY | |
|---|---|---|---|---|---|
| φ18 | A11 PROCESS<br>A12 PROCESS<br>A13 PROCESS<br>... | φ18 | B11 PROCESS<br>B12 PROCESS<br>B13 PROCESS<br>... | φ18 | C11 PROCESS<br>C12 PROCESS<br>C13 PROCESS<br>... |
| φ10 | A21 PROCESS<br>A22 PROCESS<br>A23 PROCESS<br>... | φ10 | B21 PROCESS<br>B22 PROCESS<br>B23 PROCESS<br>... | φ10 | C21 PROCESS<br>C22 PROCESS<br>C23 PROCESS<br>... |
| φ8 | A31 PROCESS<br>A32 PROCESS<br>A33 PROCESS<br>... | φ8 | B31 PROCESS<br>B32 PROCESS<br>B33 PROCESS<br>... | φ8 | C31 PROCESS<br>C32 PROCESS<br>C33 PROCESS<br>... |

FIG. 16A

FIRST PROCESS TOOLING : A   SECOND PROCESS TOOLING : B   THIRD PROCESS TOOLING : C

FIG. 16B

|  | TOOL | HOLDER | EDGE DIAMETER | TOOL PROJECTION LENGTH |
|---|---|---|---|---|
| FIRST PROCESS | a1 | b1 | 10mm | 10mm |
| SECOND PROCESS | a2 | b2 | 5mm | 5mm |
| THIRD PROCESS | a2 | b1 | 5mm | 10mm |

FIG. 16C

SIMILARITY COEFFICIENT
(1) SAME TOOL : 1000 POINTS
(2) SAME HOLDER : 500 POINTS
(3) SAME EDGE DIAMETER : 100 POINTS
(4) TOOL PROJECTION LENGTH : 10 POINTS − [DIFFERENCE IN TOOL PROJECTION LENGTH]

FIG. 17A (1) FIRST PROCESS – SECOND PROCESS
SIMILARITY = 0+0+0+5 = 5 POINTS (2) FIRST PROCESS – THIRD PROCESS
SIMILARITY = 0+500+0+10 = 510 POINTS (3) SECOND PROCESS – THIRD PROCESS
SIMILARITY = 1000+0+100+5 = 1105 POINTS

FIG. 17B

| DESCENDING ORDER OF SIMILARITY |
| --- |
| No. 1 : SECOND PROCESS – THIRD PROCESS |
| No. 2 : FIRST PROCESS – THIRD PROCESS |
| No. 3 : FIRST PROCESS – SECOND PROCESS |

FIG. 18

| | | FIRST PROCESS | SECOND PROCESS | THIRD PROCESS | ACTUAL MACHINING TIME | TOTAL TIME |
|---|---|---|---|---|---|---|
| | REMOVAL VOLUME | 300mm³ | 60mm³ | 30mm³ | | |
| (a) | TOOLING | A | B | C | 30 MINUTES | 30 MINUTES (= 30 MINUTES − 0 MINUTES) |
| | MACHINING EFFICIENCY | 30mm³/MINUTE | 6mm³/MINUTE | 3mm³/MINUTE | | |
| | MACHINING TIME | 10 MINUTES | 10 MINUTES | 10 MINUTES | | |
| (b) | TOOLING | A | C | C | 40 MINUTES | 20 MINUTES (= 40 MINUTES − 20 MINUTES) |
| | MACHINING EFFICIENCY | 30mm³/MINUTE | 3mm³/MINUTE | 3mm³/MINUTE | | |
| | MACHINING TIME | 10 MINUTES | 20 MINUTES | 10 MINUTES | | |
| (c) | TOOLING | C | C | C | 130 MINUTES | 90 MINUTES (= 130 MINUTES − 40 MINUTES) |
| | MACHINING EFFICIENCY | 3mm³/MINUTE | 3mm³/MINUTE | 3mm³/MINUTE | | |
| | MACHINING TIME | 100 MINUTES | 20 MINUTES | 10 MINUTES | | |

F I G . 19A

F I G . 19B

F I G . 19C

PROCESS INTEGRATION DETERMINING SYSTEM AND METHOD

INCORPORATION BY REFERENCE/RELATED APPLICATION

This application claims priority to Japanese Patent Application No. 2009-147831 filed on Jun. 22, 2009 the disclosure of which, including the specification, drawings and abstract, is incorporated herein by reference in its entirety.

BACKGROUND OF THE INVENTION

1. Field of the Invention

The invention relates to a system and method that are used to determine an optimal process for forming a product shape from a material shape.

2. Discussion of Background

A system that determines a machining process is, for example, described in Japanese Patent Application Publication No. 11-235646 (JP-A-11-235646). JP-A-11-235646 describes that, when there are a plurality of process candidates, processes are integrated to minimize actual machining time.

However, other than the actual machining time, there is an element of time that can be reduced through integration of processes. Therefore, even when the actual machining time elongates, there is a possibility that integration of processes leads to a reduction in time when evaluated as a whole. However, in JP-A-11-235646, only the actual machining time is intended for evaluation, and any other factors are not evaluated. Therefore, at an actual worksite, there is a possibility that the total time is elongated.

SUMMARY OF THE INVENTION

The invention provides a process determining system and method that most appropriately integrate processes in consideration of factors other than (or in addition to) an actual machining time to thereby make it possible to determine an optimal process.

According to a feature of an example of the invention, it is determined whether to integrate a process for an optimal process in consideration of a unit integration reduction time and the number of individual processes integrated in addition to an actual machining time. Thus, even when the actual machining time is elongated, the integrated process is determined to be optimal when a time obtained by multiplying the unit integration reduction time by the number of individual processes integrated is longer than the elongated (or increase in) actual machining time. By so doing, it is possible to achieve a reduction in the total time at an actual worksite.

According to another feature of an example of the invention, it is possible to reduce the number of tools and the number of holders owned by a user of a machine, and it is not necessary to purchase a new tool or a new holder. Storage and management of tools and holders require cost and time of a user. A reduction in the number of tools owned and the number of holders owned enables reduction in costs of storage and management. In addition, new purchases of a tool or a holder that is currently not owned naturally requires cost and time. Thus, by applying the aspect of the invention, total time and/or costs may be reduced.

According to a further feature of an example of the invention, it is possible to consider a tooling preparation time, so a total working time may be reduced with a reduction in tooling preparation time.

According to another feature of the invention, by way of example, it is possible to consider a time consumed for the number of times of tool replacement, so a total working time may be reduced resulting from a reduction in time for the number of times of tool replacement.

Further by way of example, according to another aspect of the invention, a similarity between toolings is considered in order to integrate processes, and an element of a similarity is any one of a type of tool, a type of holder, a tool projection length and an edge diameter of a tool, so it is possible to reliably obtain an indication of the similarity between toolings.

According to a further feature of an example of the invention, it is possible to consider ease of integration of processes and influence when the processes are integrated. By so doing, it is possible to further improve the process. As should be apparent, the invention can provide a number of advantageous features and benefits, or objects. It is to be understood that, in practicing the invention, an embodiment can be constructed to include one or more features or benefits or objects of embodiments, disclosed herein, but not others. Accordingly, it is to be understood that the preferred embodiments discussed herein are provided as examples and are not to be construed as limiting, particularly since embodiments can be formed to practice the invention that do not include each of the features of the disclosed examples.

BRIEF DESCRIPTION OF THE DRAWINGS

The foregoing and further objects, features and advantages of the invention will become apparent from the following description of example embodiments with reference to the accompanying drawings, wherein like numerals are used to represent like elements and wherein.

an actual machining time and a total time when an optimal tooling of a second process is integrated into an optimal tooling of a third process in row (b).

an actual machining time and a total time when optimal toolings of all the processes are integrated into the optimal tooling of the third process in row (c)

DETAILED DESCRIPTION OF EMBODIMENTS

Hereinafter, embodiments of the invention will be described with reference to the accompanying drawings.

Figure 1:
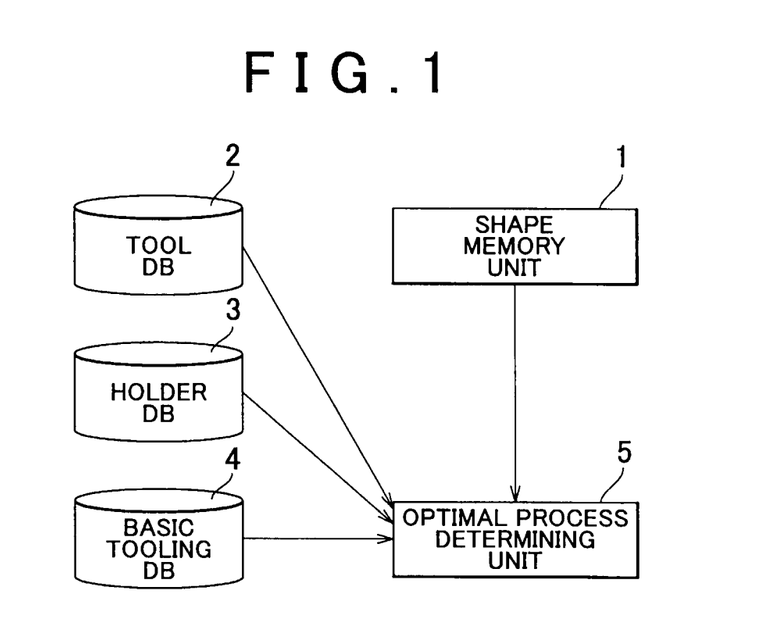
FIG. 1 is a configuration diagram of an optimal process determining system according to an embodiment.

A process determining system according to the present embodiment will be described with reference to an example illustrated in FIG. 1 to FIG. 5. As shown in FIG. 1, the process determining system includes a shape memory unit 1, a tool DB 2 (Data Base), a holder DB 3, a basic tooling DB 4 and an optimal process determining unit 5.

Figure 2:
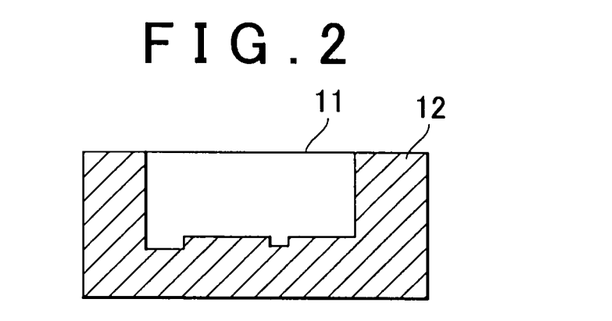
FIG. 2 is a view that shows a material shape and a product shape.

The shape memory unit 1 stores a material shape and a product shape created by a computer aided design (CAD) (not shown). In the present example, as shown in FIG. 2, the material shape is denoted by 11, and the product shape is denoted by 12. That is, the product shape 12 is formed from the material shape 11 by pocketing or milling in example. In the example, the bottom shape of a pocket portion has a deep portion and a shallow portion.

Figure 3:
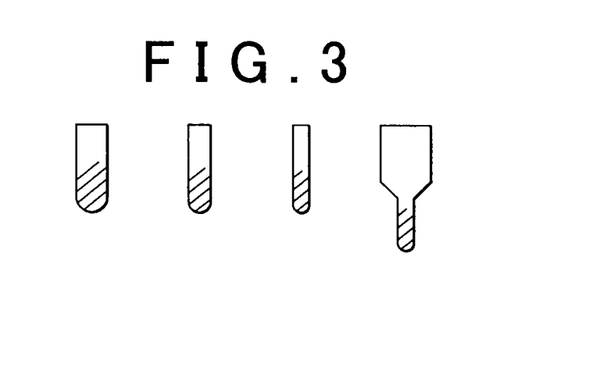
FIG. 3 is a view that shows information of a plurality of tools stored in a tool DB (data base)

The tool DB 2 (which is part of the tool holder information storage unit in the example) stores information of a plurality of tools. As shown in FIG. 3, by way of example, each of the tools is a ball end mill, and there are the plurality of tools having different edge diameters and different edge shapes. As used herein, the "edge diameter of a tool" means the outside diameter of an operating edge portion of the tool. For example, in FIG. 3, the leftmost tool has the largest edge diameter, the second tool from the left has the second largest edge diameter, and two types of tools on the right have the smallest edge diameters. In addition, as shown in FIG. 3, the shapes of the three types of tools on the left are such that a portion other than the distal end portion has a constant diameter circular cylindrical shape, and the shape of one type of tool on the right in FIG. 3 is such that a portion other than the distal end portion has a stepped circular cylindrical shape. That is, the shape of the type of tool on the right in FIG. 3 is formed of a shape having a base portion that is larger in outside diameter than the edge portion. Then, in the tool DB 2, tool numbers are respectively associated with pieces of information of the tools.

Figure 4:
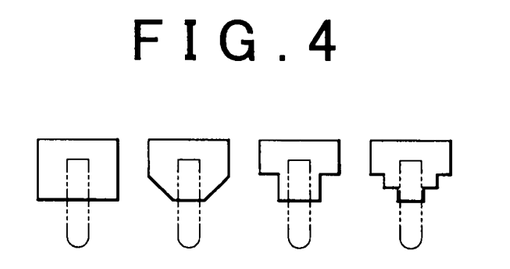
FIG. 4 is a view that shows information of a plurality of holders stored in a holder DB.
Figure 5:
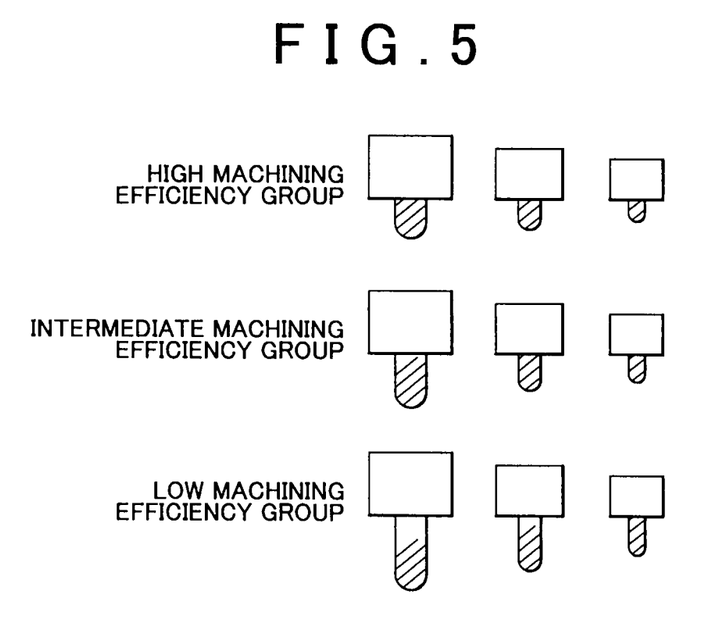
FIG. 5 is a view that shows a plurality of basic toolings stored in a basic tooling DB.

The holder DB 3 (which is also part the tool holder information storage unit) stores information of a plurality of holders. As shown in FIG. 4, there are a plurality of types of holders that can respectively hold tools having different edge diameters and different edge shapes, and the holders that can hold the same tool also have multiple shapes. In the holder DB 3, holder numbers are respectively associated with pieces of information relating to the holders.

The basic tooling DB 4 (which is also part of the basic tooling storage unit according to the example) stores a basic tooling for each of a plurality of machining efficiency groups and for each of different edge diameters of the tools. The "basic tooling" is a combination of a tool, a holder and a tool projection length. The "machining efficiency" corresponds to a removal volume per unit time. For example, when a given workpiece material (work) is cut by a tool of a given material, tool projection length (L)/tool edge diameter (D) ($\approx$stiffness) may be used as the machining efficiency. In addition, the "machining efficiency group" means a group of which the machining efficiency falls within a predetermined range.

In this example, there are basic toolings for three types of high, intermediate and low machining efficiency groups. Here, for the high machining efficiency group, L/D is 5 or below; for the intermediate machining efficiency group, L/D is between 5 and 10; and for the low machining efficiency group, L/D is 10 or above.

The optimal process determining unit 5 determines an optimal process for forming the product shape from the material shape. The optimal process is composed of a plurality of process candidates and the sequence of the process candidates. In this example, each process candidate includes information of a tooling, including a tool, a holder and a tool projection length, a removal region and an index angle (tool axis position). FIG. 6 to FIG. 9 are flowcharts that show an optimal process determining method for determining the optimal process. The process determining unit 5 can be, for example, a processor, controller or computer, and the stored data bases (DB) can be stored in an appropriate storage medium, such as in a memory of a computer, and can be part of the same device or separate from the device including the process determining unit 5. The determining system can be included in the control system of the machine tool, can be a separate system, or can be a system connected to a machine tool control system. Once the process is determined, the process is carried out by the machine tool to form products shaped using the process.

Figure 6:
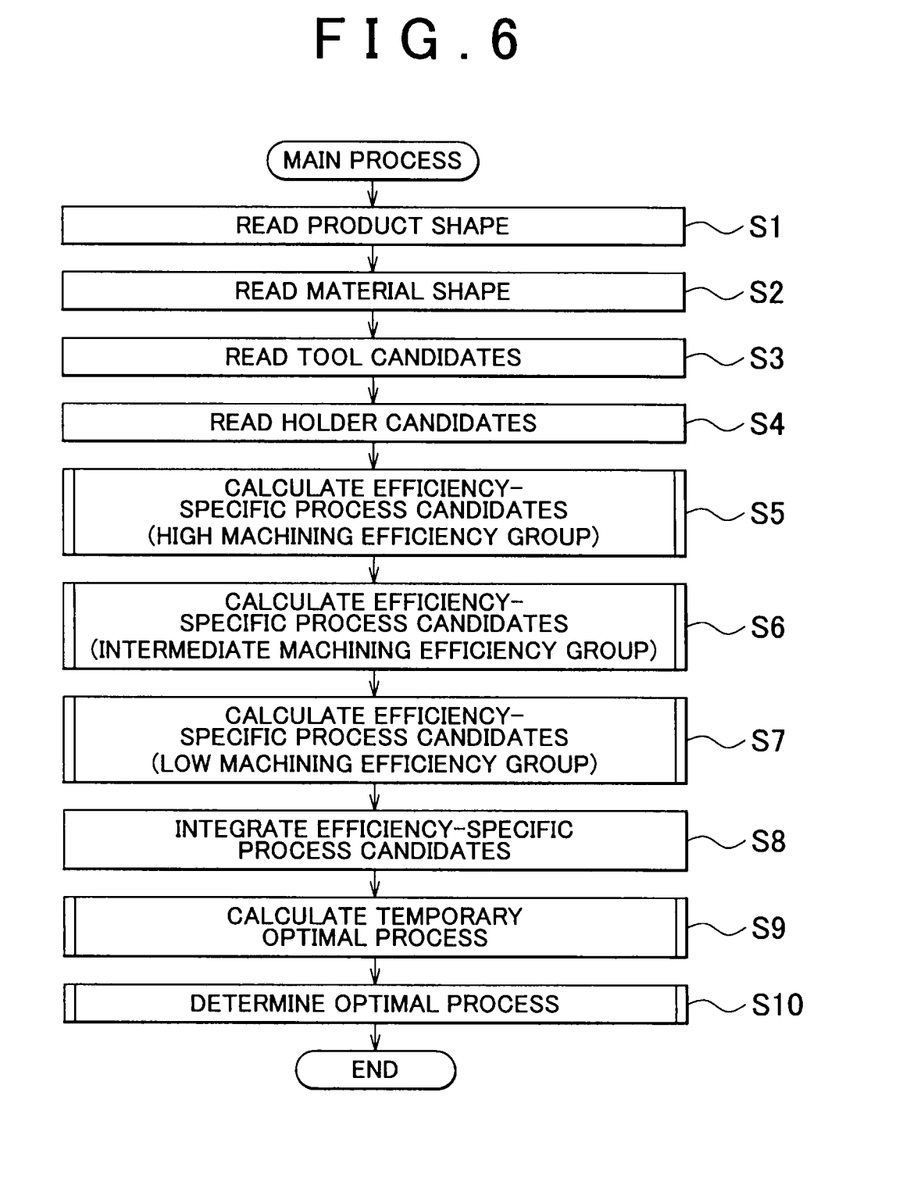
FIG. 6 is a flowchart of a main process executed by an optimal process determining unit.

As shown in FIG. 6, first, the optimal process determining unit 5 reads the product shape from the shape memory unit 1 (S1). Subsequently, the material shape is read from the shape memory unit 1 (S2). Thereafter, tool candidates are read from the tool DB 2 (S3), and holder candidates are read from the holder DB 3 (S4).

Figure 7:
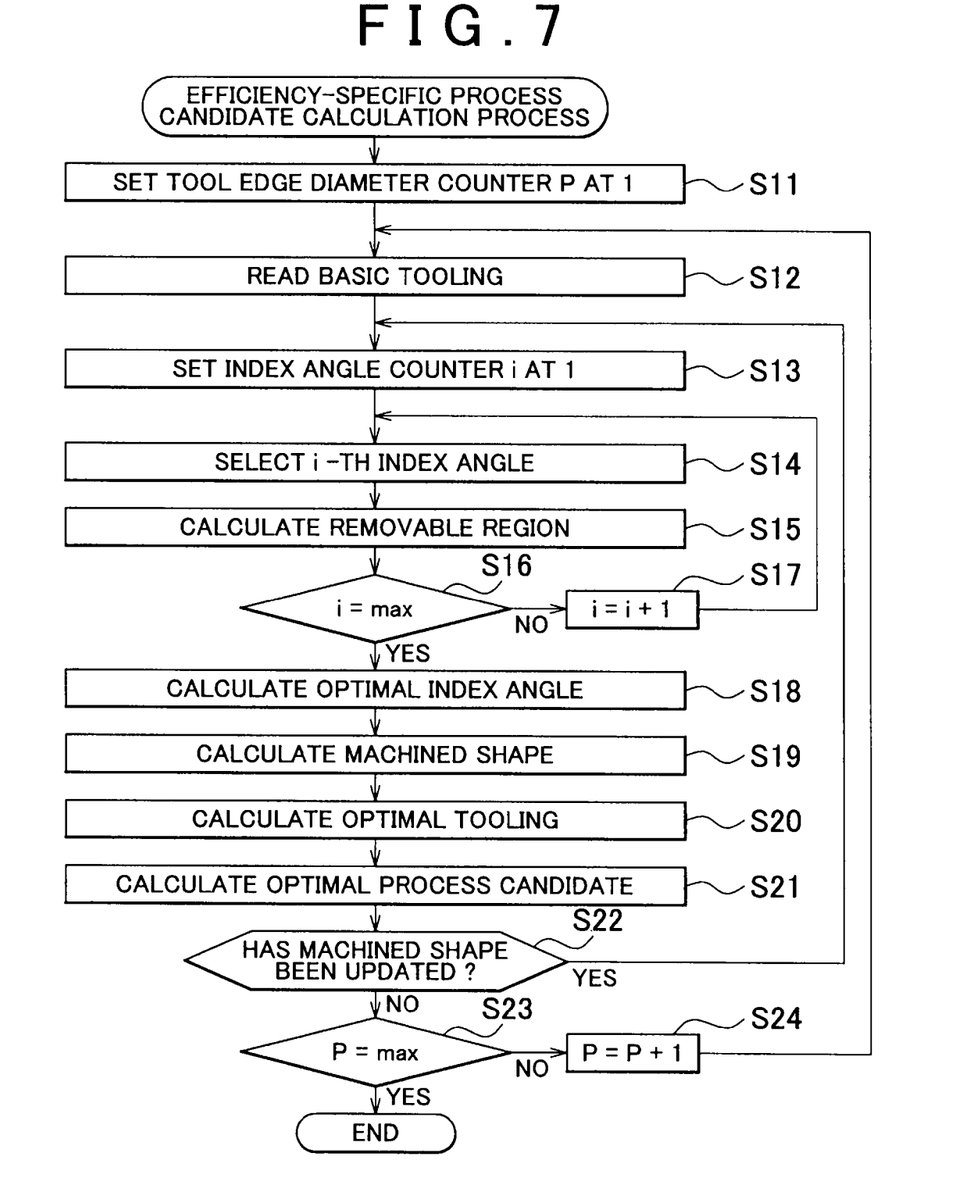
FIG. 7 is a flowchart of an efficiency-specific process candidate calculation process.

After that, an efficiency-specific process candidate calculation process is executed for a high machining efficiency group (S5). In the efficiency-specific process candidate calculation process, as shown in FIG. 7, a tool edge diameter counter P is set at 1 (S11). Here, by way of example, among the tools stored in the tool DB 3, the counter P of the largest edge diameter, for example, $\phi$ 18, is set at 1, the counter P of the second largest edge diameter, for example, $\phi$ 10, is set at 2, and the counter P of the third largest edge diameter, for example, $\phi$ 8, is set at 3.

Subsequently, a basic tooling for the high machining efficiency group is read from the basic tooling DB 4 (S12). Then, the counter i of the index angle of the tool is set at 1 (S13). The index angle corresponds to the tool axis position. Thereafter, the i-th index angle is selected (S14). That is, an actual index angle is selected (as discussed further below). After that, a removable region when the material shape is machined by the basic tooling at the selected index angle is calculated (S15).

Figure 10A:
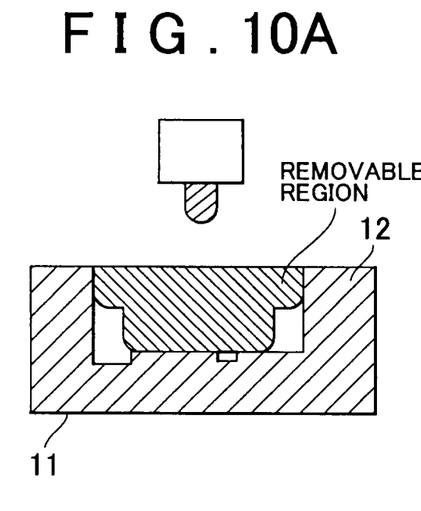
FIG. 10A and FIG. 10B are views that respectively show removable regions for different tool axis positions.
Figure 10B:
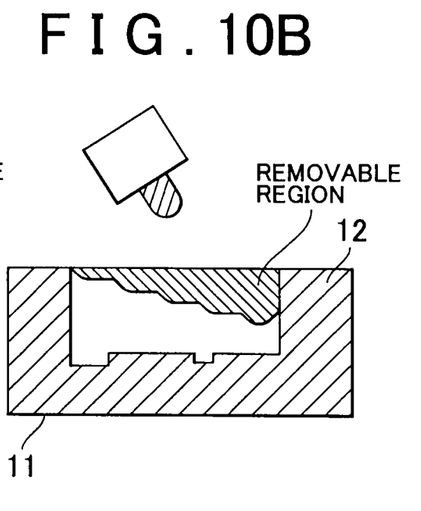

The removable regions are shown in FIG. 10A and FIG. 10B. First, the removable region at a certain index angle is a hatched region indicated as the removable region in FIG. 10A. That is, the above removable region may be machined without interference of the tool or the holder with a portion of a product shape. When the index angle is changed, for example, the removable region is a hatched region indicated as the removable region in FIG. 10B.

The description will be provided by referring back to FIG. 7. Subsequently, it is determined whether the index angle counter i is a maximum value (S16). When the index angle counter i is not a maximum value, the index angle counter i is incremented by 1 (S17) and then the process is repeated from step S14. That is, for each of a plurality of index angles, a removable region of the basic tooling is calculated.

After that, an index angle, at which a removal volume is maximal among the plurality of removable regions (for example, hatched regions indicated as the removable regions in FIG. 10A and FIG. 10B), is calculated (S18). When the index angle of FIG. 10A is compared with the index angle of FIG. 10B, the index angle of FIG. 10A is selected.

Figure 11:
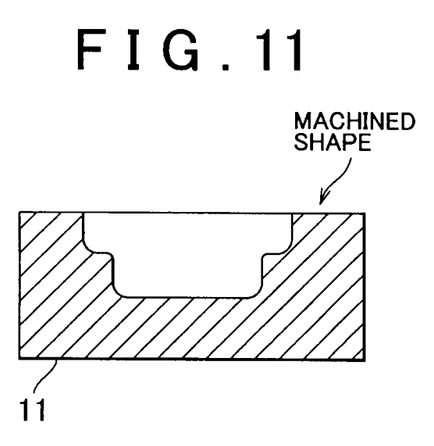
FIG. 11 is a view that shows a machined shape in the case of FIG. 10A.

Then, a shape machined at the index angle calculated in step S18 is calculated (S19). As shown in FIG. 11, the machined shape is a shape excluding the removable region from the material shape. That is, the machined shape is a shape machined by the basic tooling from the material shape.

Figure 12A:
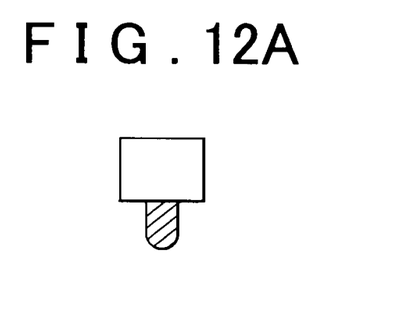
FIG. 12A and FIG. 12B are views that show toolings having different machining efficiencies.
Figure 12B:
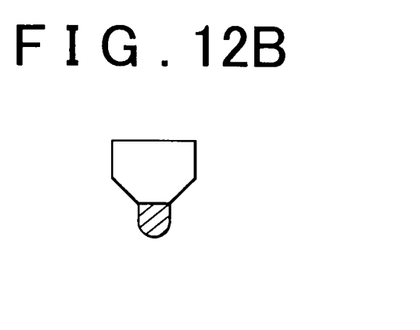

Subsequently, an optimal tooling is calculated (S20). The optimal tooling is able to machine the material shape into the machined shape calculated in step S19 without interfering with the machined shape, and has the highest machining efficiency. For example, it is assumed that the toolings shown in FIG. 12A and FIG. 12B are able to machine the material shape into the machined shape. In this case, when making a comparison between the tooling shown in FIG. 12A and the tooling shown in FIG. 12B, the tooling shown in FIG. 12B has a short tool projection length and, therefore, has a high machining efficiency. In this way, when a plurality of combinations of a tool, a holder and a tool projection length are obtained, the combination having the highest machining efficiency is selected from among the plurality of combinations. The basic tooling is an index tooling for obtaining a predetermined machining efficiency group, and may be different from the optimal tooling selected here or may be the same in some cases.

After that, an optimal process candidate using the optimal tooling calculated in step S20 is calculated (S21). The optimal process candidate is information relating to a plurality of processes, each including an optimal tooling and an optimal index angle.

Thereafter, it is determined whether the machined shape calculated in step S19 is updated (S22). When the machined shape has been updated, the process is repeated from step S13. Initially, the machined shape is newly calculated, so, of course, the process is repeated from S13. In the processes from the next step S13 to step S21, the processes are executed while the initially calculated machined shape is regarded as a material shape.

Figure 13A:
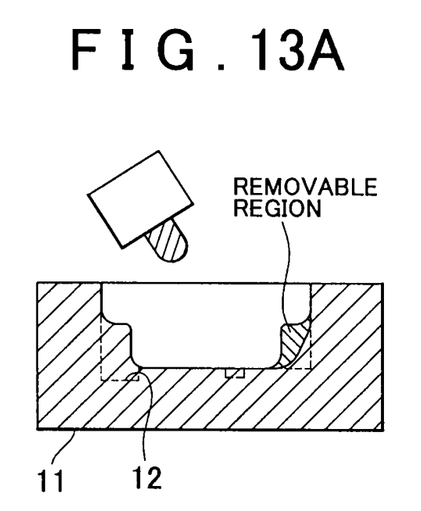
FIG. 13A shows a removable region for a changed tool axis position.
Figure 13B:
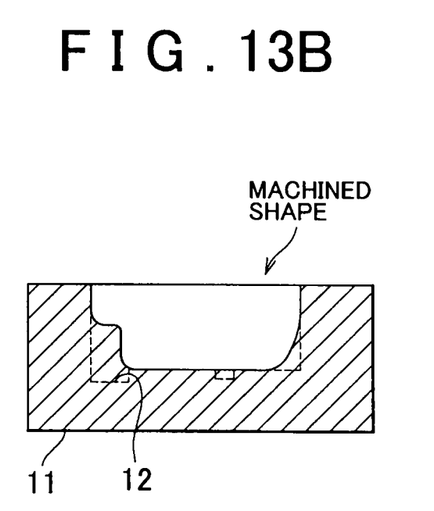
FIG. 13B shows a machined shape in the case of FIG. 13A.

For example, when machining is performed using the shape shown in FIG. 11 as a material shape, the hatched region indicated as the removable region in FIG. 13A is a removable region, and the shape shown in FIG. 13B is a machined shape. Then, in step S21, this process is added to the already calculated optimal process candidate. Then, in step S22, it is determined that the machined shape has been updated, so the process is repeated from step S13 again.

Figure 14A:
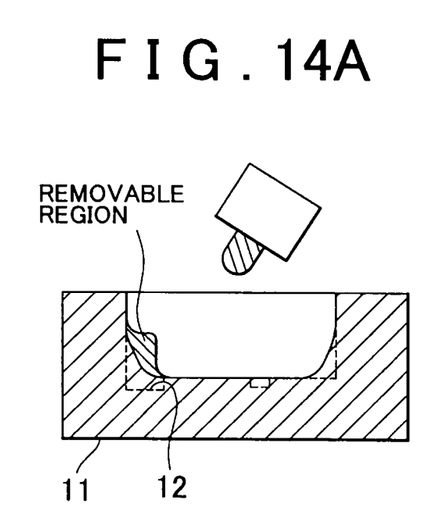
FIG. 14A shows a removable region for a further changed tool axis position.
Figure 14B:
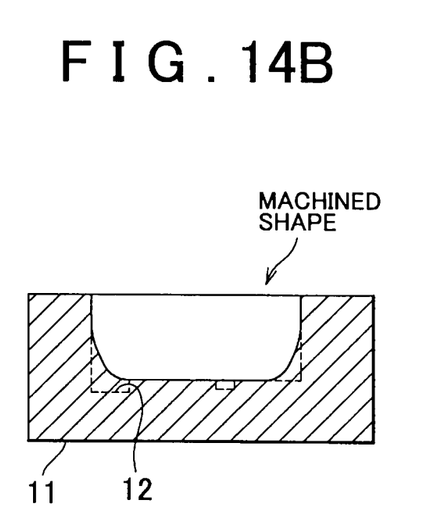
FIG. 14B shows a machined shape in the case of FIG. 14A.

In order to further continue the process, machining is performed using the shape shown in FIG. 13B as a material shape. In this case, the hatched region indicated as the removable region in FIG. 14A is a removable region, and the shape shown in FIG. 14B is a machined shape. Then, in step S21, this process is added to the already calculated optimal process candidate. Then, in step S22, it is determined that the machined shape has been updated, so the process is repeated from step S13 again.

Subsequently, when the machined shape is not updated any more, it is determined whether the tool edge diameter counter P is a maximum value (S23). When the tool edge diameter counter P is not a maximum value, the tool edge diameter counter P is incremented by 1 (S24) and then the process is repeated from step S12. That is, an optimal process candidate is calculated for each of the plurality of tool edge diameters. Then, when the tool edge diameter counter P reaches the maximum value, the efficiency-specific process candidate calculation process is ended.

The description will be provided by referring back to FIG. 6. In the above description, the efficiency-specific process candidate calculation process in the case of the high machining efficiency group is executed in step S5. Subsequently, the efficiency-specific process candidate calculation process in the case of the intermediate machining efficiency group is executed (S6). In addition, after that, the efficiency-specific process candidate calculation process in the case of the low machining efficiency group is executed (S7). In this way, an optimal process candidate is calculated for each of the plurality of different machining efficiency groups and each of the tool edge diameters.

Figure 15:
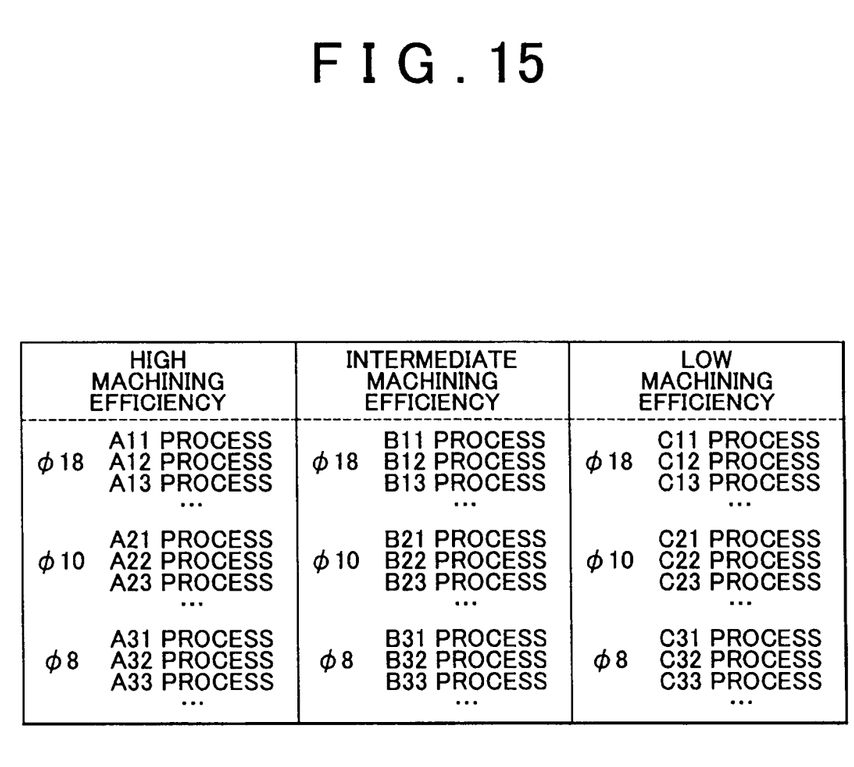
FIG. 15 shows processes subjected to efficiency-specific process candidate integration.

Thereafter, the optimal process candidates calculated respectively in steps S5 to S7 are integrated to calculate a temporary optimal process (S9). For example, as shown in FIG. 15, the processes are integrated in order of the optimal process candidates for the high machining efficiency group, the optimal process candidates for the intermediate machining efficiency group and the optimal process candidates for the low machining efficiency group. The processes included in each of the optimal process candidates correspond to individual processes. That is, each of the individual processes includes information of a tooling, which includes a tool, a holder and a tool projection length, a removal region and an index angle (tool axis position).

Figure 8:
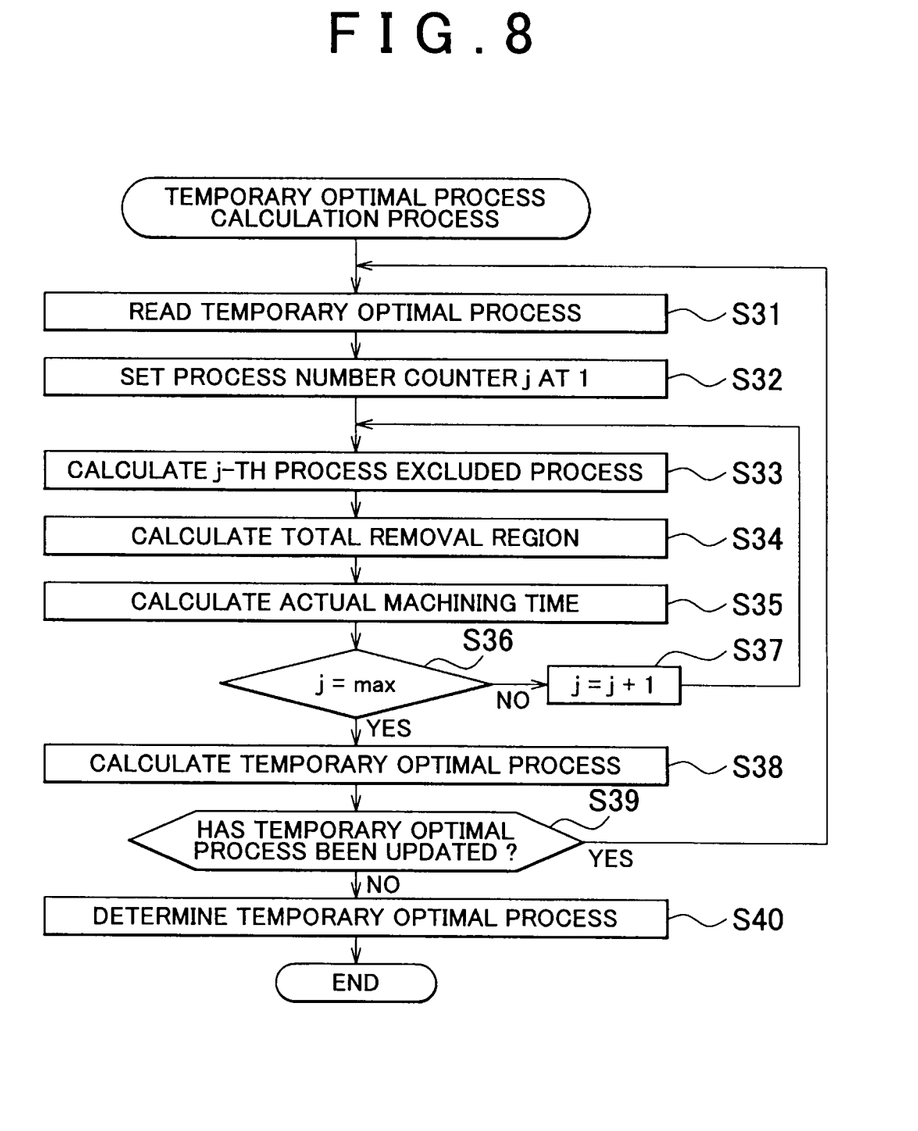
FIG. 8 is a flowchart of a temporary optimal process calculation process.

Subsequently, a further optimal temporary optimal process is calculated on the basis of the integrated temporary optimal process. This process is shown in FIG. 8. As shown in FIG. 8, first, in the temporary optimal process calculation process, the temporary optimal process calculated in step S8 in FIG. 6 is read (S31).

The process number counter j of the individual process of the temporary optimal process is set at 1 (S32). In addition, a process that excludes the j-th process from the individual processes (j-th process excluding process) is calculated (S33). After that, first, a total removal region when the current temporary optimal process (all the individual processes) is executed is calculated (S34). At the same time, a total removal region when the j-th process excluding process (remaining individual processes excluding the j-th process) is executed is calculated (S34). Subsequently, an actual machining time when the current temporary optimal process is executed is calculated (S35). At the same time, an actual machining time when the j-th process excluding process is executed is calculated (S35).

After that, it is determined whether the process number counter j is a maximum value (S36). When the process number counter j is not a maximum value, the process number counter j is incremented by 1 (S37) and then the process is repeated from step S33. That is, a total removal region and an actual machining time are calculated for each of partially excluded processes that are obtained by sequentially excluding one of the individual processes.

Then, as the process number counter j reaches the maximum value, the temporary optimal process is calculated (updated). That is, when the plurality of optimal process candidates are partially excluded, a partially excluded process of which the total removal region coincides with the total removal region of the temporary optimal process is extracted. That is, among the partially excluded process, a partially excluded process that can remove the total removal region of the current temporary optimal process is extracted. In addition, when a plurality of partially excluded processes are extracted, the process having the shortest actual machining time among the plurality of partially excluded processes is used to update the temporary optimal process (S38).

Thereafter, when the temporary optimal process has been updated (S39), the process is repeated from step S31. Here, the temporary optimal process read in step S31 is the temporary optimal process updated in step S38. That is, by repeating steps S31 to S38, individual processes may be excluded so that the total removal region remains unchanged and the actual machining time reduces. By so doing, individual processes having substantially overlapping removal regions are excluded.

Then, when the temporary optimal process is not updated any more (S39), the temporary optimal process calculated in step S38 is determined as the temporary optimal process (S40). Then, the temporary optimal process calculation process is ended.

Figure 9:
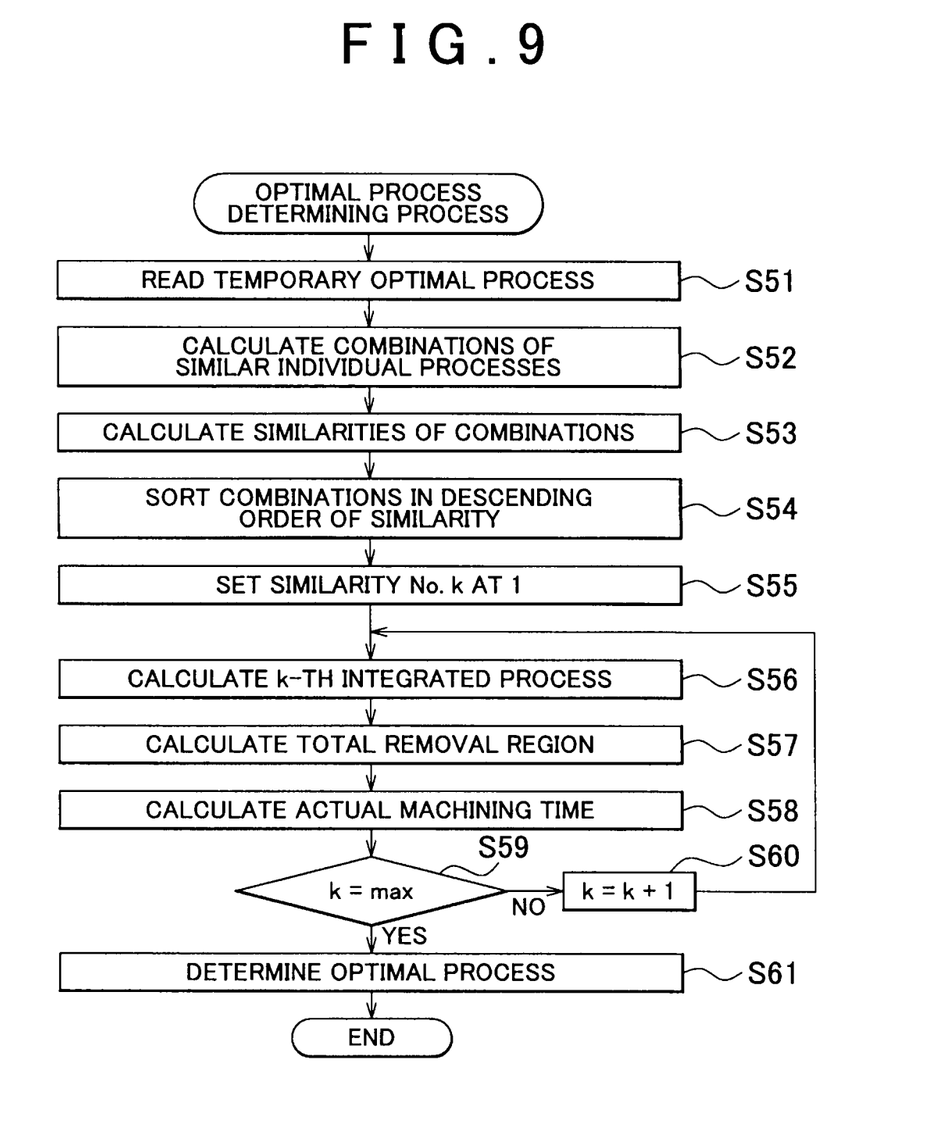
FIG. 9 is a flowchart of an optimal process determining process.

The description will be provided by referring back to FIG. 6. In step S9, the temporary optimal process calculation process is executed. Subsequently, an optimal process determining process for determining a further optimal process is executed on the temporary optimal process (S10). The optimal process determining process is shown in FIG. 9. As shown in FIG. 9, first, in the optimal process calculation process, the temporary optimal process calculated in step S9 in FIG. 6 is read (S51).

Figure 16A:
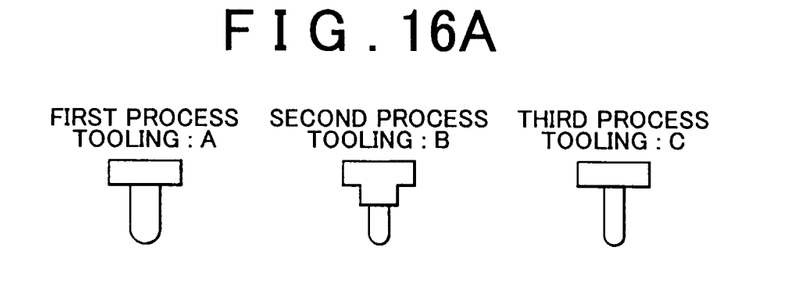
FIG. 16A shows an optimal tooling of each process.
Figure 16B:
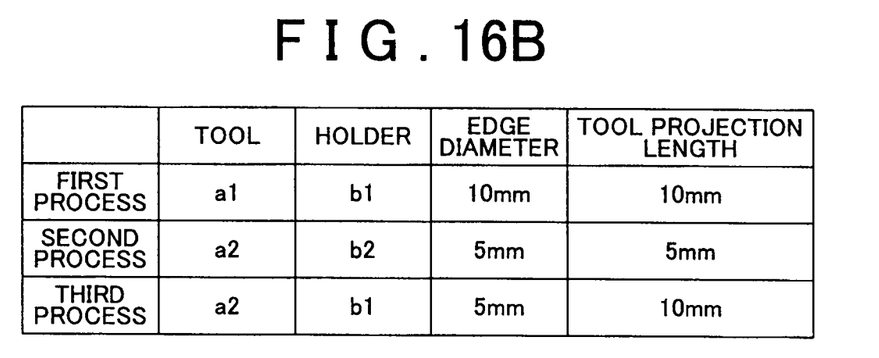
FIG. 16B shows the specifications of each process.
Figure 16C:
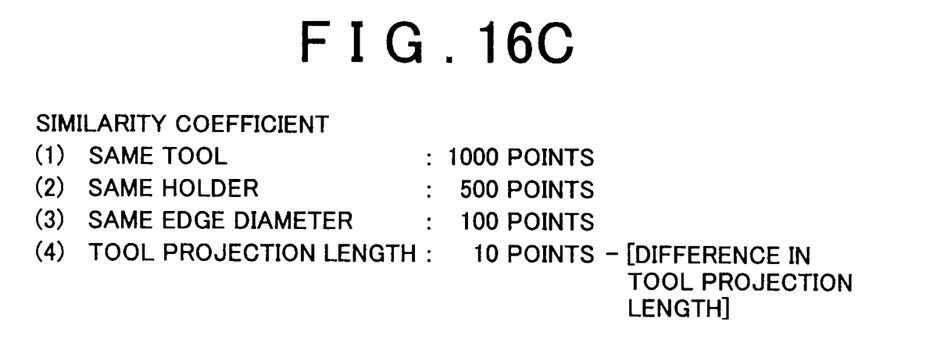
FIG. 16C shows a similarity coefficient for each of the specifications.

After that, two similar individual processes are selected from the temporary optimal process (S52), and then a similarity between the toolings of the two individual processes is calculated (S53). The similarity will be described with reference to FIG. 16A to FIG. 17B. Individual processes in the temporary optimal process will be described as first to third processes. Here, it is assumed that the tooling of the first process, the tooling of the second process and the tooling of the third process are determined as shown in FIG. 16A. The specifications of each tooling are shown in FIG. 16B. That is, elements of the similarity include the type of tool, the type of holder, a tool edge diameter and a tool projection length. At this time, similarity coefficients are preset as shown by way of example in FIG. 16C. The similarity coefficient is varied among the elements.

Figure 17A:
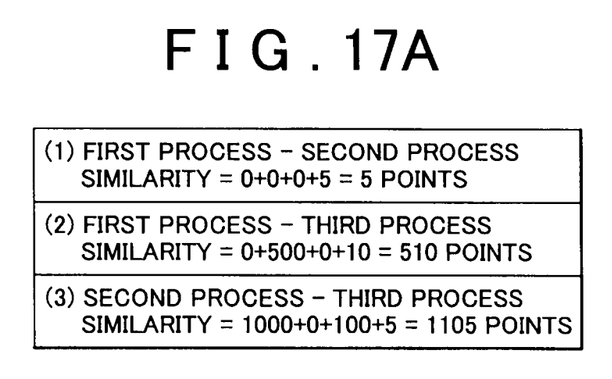
FIG. 17A shows a similarity for each process combination.

By so doing, as shown in (1) of FIG. 17A, the similarity between the first process and the second process scores 5 points; as shown in (2) of FIG. 17A, the similarity between the first process and the third process scores 510 points; and, as shown in (3) of FIG. 17A, the similarity between the second process and the third process scores 1105 points. In (1) to (3) of FIG. 17A, four numerals for calculating a similarity sequentially indicate, from the left, (1) a similarity coefficient for the same tool, (2) a similarity coefficient for the same holder, (3) a similarity coefficient for the same edge diameter and (4) a similarity coefficient for the tool projection length in FIG. 16C.

Figure 17B:
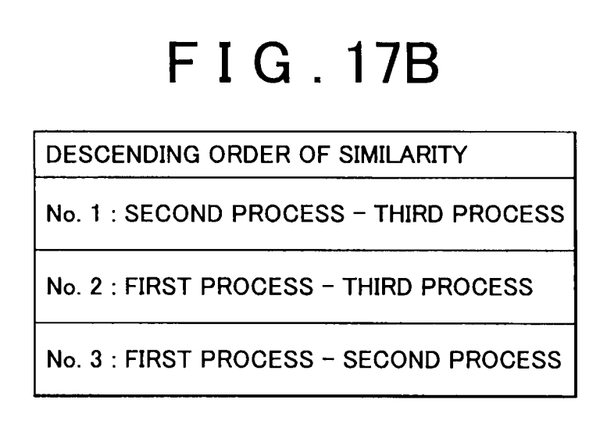
FIG. 17B shows combinations sorted in descending order of similarity.

Subsequently, the combinations are sorted in descending order of similarity (S54). That is, as shown in FIG. 17B, the combination of "the second process and the third process" having the highest similarity is a similarity No. 1, the combination of "the first process and the third process" having the second highest similarity is a similarity No. 2, and the combination of "the first process and the second process" having the third highest similarity is a similarity No. 3.

After that, the counter k of the similarity No. is set at 1 (S55). Thereafter, an integrated process when the tooling of one of the processes of the similarity No. k is integrated into the tooling of the other one of the processes of the similarity No. k is calculated (S56). That is, an initially calculated integrated process includes an integrated process obtained by integrating the tooling of the second process into the tooling of the third process and an integrated process obtained by integrating the tooling of the third process into the tooling of the second process.

Thereafter, total removal regions when the respective integrated processes are performed are calculated (S57). Then, actual machining times when the respective integrated processes are performed are calculated (S58). Subsequently, the optimal process determining unit 5 determines whether the similarity No. k is a maximum value (S59). When the similarity No. k is not a maximum value, the optimal process determining unit 5 adds 1 to the similarity No. k (S60) and then repeats the process from step S56. That is, each of the similarity Nos. is integrated in descending order, and then a total removal region and an actual machining time are calculated for each of the integrated processes that can be integrated.

When the similarity No. k reaches a maximum value, an optimal process is determined from among the temporary optimal process and the plurality of integrated processes (S61). In determination of an optimal process, first, only the integrated processes that have the same total removal region as the total removal region of the temporary optimal process are extracted. After that, an optimal process is determined from among the extracted integrated processes and the temporary optimal process.

Figure 18:
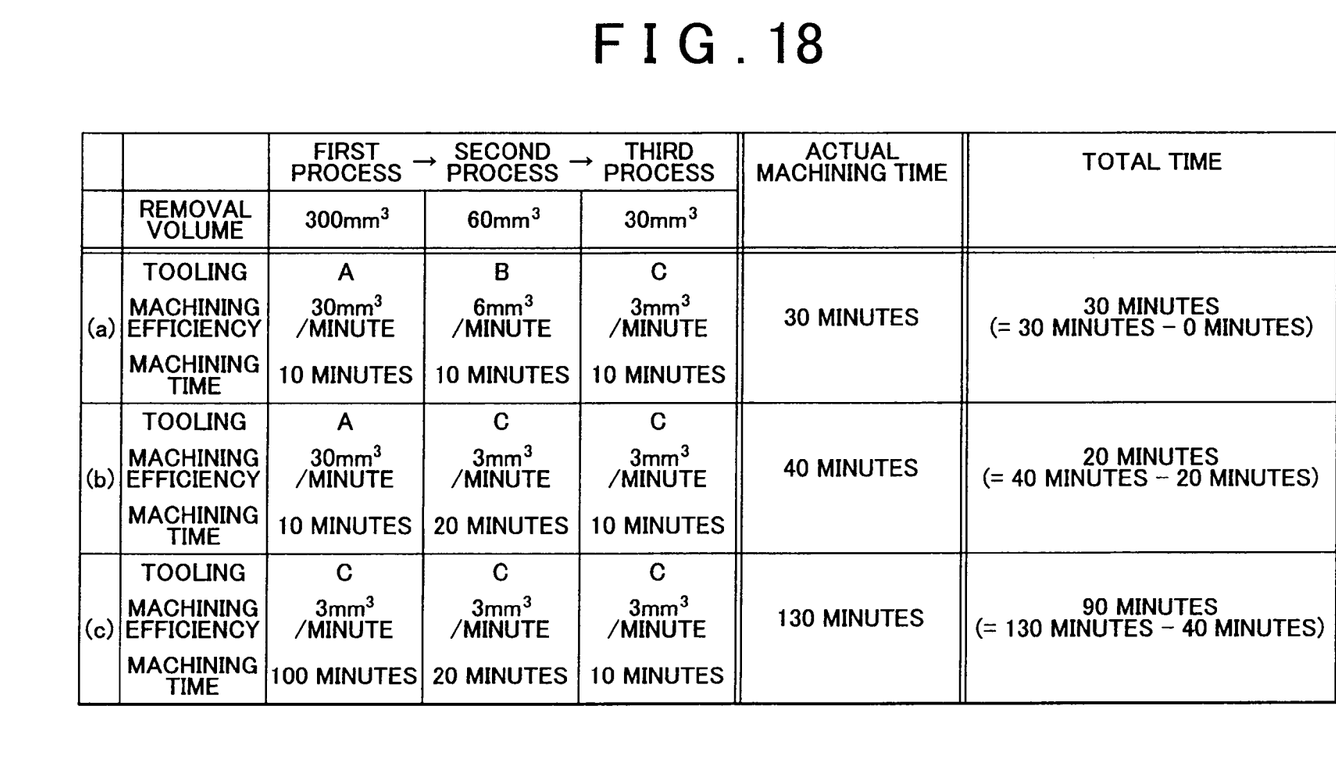
FIG. 18 shows an actual machining time and a total time before process integration in row (a)

A temporary optimal process is shown in the row (a) in the table of FIG. 18, a process that integrates a tooling "B" of the second process into a tooling "C" of the third process among the extracted integrated processes is shown in the row (b) in the table of FIG. 18, and a process that integrates toolings "A" and "B" of the first process and second process into the tooling "C" of the third process among the extracted integrated processes is shown in the row (c) in the table of FIG. 18.

In order to make a comparison among the processes, the case set as follows is taken as an example. The removal volume of the first process is 300 mm$^3$, and the machining efficiency (removal volume per unit time) of the tooling "A" of the first process is 30 mm$^3$/minute. The removal volume of the second process is 60 mm$^3$, and the machining efficiency of the tooling "B" of the second process is 6 mm$^3$/minute. The removal volume of the third process is 30 mm$^3$, and the machining efficiency of the tooling "C" of the third process is 3 mm$^3$/minute.

Then, in the temporary optimal process, the actual machining time of the first process is 10 minutes, the actual machining time of the second process is 10 minutes, and the actual machining time of the third process is 10 minutes. That is, the actual machining time of the temporary optimal process is 30 minutes.

In the case of the integrated process of row (b) of FIG. 18, the first process uses the tooling "A", and the second process and the third process use the tooling "C". That is, the integrated process of row (b) of FIG. 18 shows the case where the tooling of the second process is integrated into the tooling of the third process. In this case, the actual machining time of the first process is 10 minutes, the actual machining time of the second process is 20 minutes, and the actual machining time of the third process is 10 minutes. That is, the actual machining time of the temporary optimal process is 40 minutes.

In the case of the integrated process of row (c) FIG. 18, all the first to third processes use the tooling "B". That is, the integrated process of row (c) FIG. 18 shows the case where the toolings of the first and second processes are integrated into the tooling of the third process. In this case, the actual machining time of the first process is 100 minutes, the actual machining time of the second process is 20 minutes, and the actual machining time of the third process is 10 minutes. That is, the actual machining time of the temporary optimal process is 130 minutes.

Then, a total time is calculated in consideration of a unit integration reduction time for the actual machining time. The total time is calculated by [Actual Machining Time]−[Unit Integration Reduction Time]×[Number of Integrations]. Here, the unit integration reduction time is a value corresponding to a possession conversion time that is obtained by converting the possession of a tool and a holder by a user of a machine into a time, a tooling preparation time for setting a tool and a holder to the machine or a time consumed for the number of times of tool replacement carried out for machining. Here, the unit integration reduction time is 20 minutes.

In addition, the number of integrations is a number by which the toolings of the processes in the temporary optimal process are integrated. That is, the number of integrations in the case of row (b) of FIG. 18 is 1, and the number of integrations in the case of row (c) FIG. 18 is 2.

Thus, as indicated in the column of total time in FIG. 18, the total time of the temporary optimal process shown in row (a) of FIG. 18 is 30 minutes, the total time of the integrated process shown in row (b) of FIG. 18 is 20 minutes, and the total time of the integrated process shown in row (c) FIG. 18 is 90 minutes. The process having the shortest total time is the integrated process shown in row (b) of FIG. 18. Then, the above integrated process is determined as the optimal process.

By determining the optimal process as described above, it is possible to determine a further optimal process. In addition, by making a comparison among the temporary optimal process and the integrated processes on the basis of a total time in consideration of a unit integration reduction time, even when the actual machining time is elongated, the integrated process is determined to be optimal when a time obtained by multiplying the unit integration reduction time by the number of individual processes integrated is longer than the elongated actual machining time. By so doing, it is possible to achieve a reduction in total time at an actual worksite.

Particularly, by setting a value of a unit integration reduction time so as to correspond to a possession conversion time, it is possible to reduce the number of tools and the number of holders, possessed by a user of a machine, and it is not necessary to purchase a new tool or a new holder. A reduction in the number of tools or the number of holders possessed enables reduction in costs of storage and management. Thus, a total time may be eventually reduced, and costs may be reduced.

In addition, by setting a value of a unit integration reduction time so as to correspond to a tooling preparation time, it is possible to reduce a total working time with a reduction in tooling preparation time. In addition, by setting a value of a unit integration reduction time so as to correspond to a time consumed for the number of times of tool replacement, it is possible to reduce a total working time with a reduction in time consumed for the number of times of tool replacement.

In addition, an element of the similarity is any one of the type of tool, the type of holder, a tool projection length and a tool edge diameter, and the similarity coefficient of each element is varied. By so doing, easiness of integration of processes and influence when the processes are integrated may be considered. By so doing, it is possible to determine a further optimal process.

OTHER ALTERNATIVE EMBODIMENTS

In the example of the above first embodiment, the optimal process determining system intended for a five-axis machine tool that is able to change the index angle (tool axis position) is described. The intended five-axis machine tool may be not only a five-axis index machine tool but also a five-axis simultaneous machine tool. The five-axis index machine tool carries out machining so that, in a state where at least one of the rotation axes is indexed (fixed), the other rotation axes are moved. In addition, the five-axis simultaneous machine tool carries out machining while simultaneously controlling travel axes and rotation axes.

Other than the above, the aspect of the invention may also be applied to an optimal process determining system intended for a machine tool that is able to move along only three orthogonal axes. This example eliminates processes regarding the index angle (tool axis position). Specifically, steps S13 to S18 and S22 in the efficiency-specific process candidate calculation process shown in FIG. 7 can be eliminated. The other configuration is substantially the same.

Figure 19A:
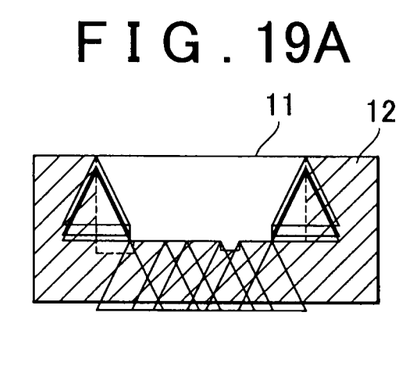
FIG. 19A, FIG. 19B and FIG. 19C show removable regions when basic tooling templates are used, and FIG. 19A, FIG. 19B and FIG. 19C respectively show high, intermediate and low machining efficiency groups.
Figure 19B:
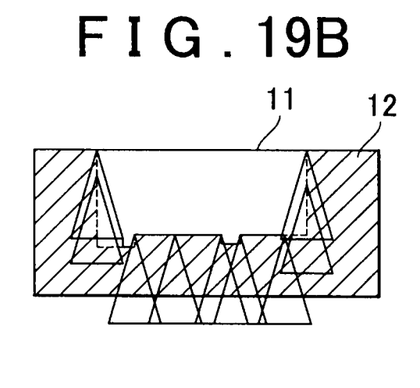
Figure 19C:
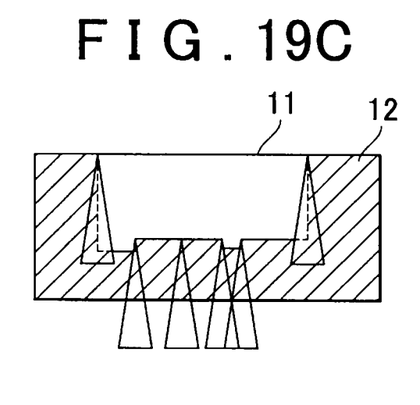

In addition, in the above embodiment, a removable region is calculated using the basic tooling (S15) in the efficiency-specific process candidate calculation process shown in FIG. 7. Other than the above, templates shown in FIG. 19A to FIG. 19C, corresponding to basic toolings, may be used. For example, these templates each have a shape that is obtained so that the vertex of a cone shape traces a machined surface of a product shape. Then, the basic tooling template, as well as the above described basic tooling, is set for each of the plurality of machining efficiency groups. For example, the basic tooling templates respectively shown in FIG. 19A, FIG. 19B and FIG. 19C correspond to the high, intermediate and low machining efficiency groups, respectively. In addition, in the above example, there are three types of machining efficiency groups, that is, high, intermediate and low; instead, there may be two types of machining efficiency groups or four or more types of machining efficiency groups.

What is claimed is:

1. An optimal process determining system comprising:
    a shape memory unit that stores a material shape and a product shape;
    a tool holder information storage unit that stores information of a plurality of tools and information of a plurality of holders; and
    a process determining unit including a processor that determines an optimal process for forming the product shape from the material shape, wherein the process determining unit executes:
    a temporary optimal process determining step of determining a temporary process that includes information of a plurality of individual processes, wherein the information of each process includes tooling information comprising the tool, the holder, and a tool projection length, and wherein the information further includes a sequence of the plurality of individual processes;
    a similarity determining step of determining a similarity between toolings of a selected two individual processes in the temporary process;

an integrated process determining step of determining a plurality of integrated processes for which the tooling of one of the individual processes having a high similarity is integrated into the tooling of the other one of the individual processes; and a process determining step of determining a process from among the plurality of integrated processes on a basis of an actual machining time in each of the integrated processes, a unit integration reduction time that is reduced as one of the toolings of the individual processes is integrated, and a number of the individual processes integrated.

2. The process determining system according to claim 1, wherein the unit integration reduction time is a value corresponding to a possession conversion time that is a time of possession of the tool and the holder by a user of a machine.

3. The process determining system according to claim 1, wherein the unit integration reduction time is a value corresponding to a tooling preparation time for setting the tool and the holder to a machine.

4. The process determining system according to claim 1, wherein the unit integration reduction time is a value corresponding to a time consumed for a number of times of tool replacement carried out for machining.

5. The optimal process determining system according to claim 1, wherein the similarity is determined on the basis of at least one element selected from among a type of the tool, a type of the holder, tool projection length, and an edge diameter of the tool.

6. The optimal process determining system according to claim 5, wherein the similarity is set so that a similarity coefficient is varied among the elements.

7. A processor implemented optimal process determining method comprising:

storing a material shape and a product shape in a shape memory unit;

storing information of a plurality of tools and a plurality of holders in a tool holder information storage unit;

a temporary process determining step of determining a temporary process that includes information of a plurality of individual processes, each including a tooling composed of the tool, the holder and a tool projection length, and a sequence of the plurality of individual processes;

a similarity determining step of determining a similarity between toolings of the selected two individual processes in the temporary process;

an integrated process determining step of determining a plurality of integrated processes for which the tooling of one of the individual processes having a high similarity is integrated into the tooling of the other one of the individual processes; and a process determining step of determining, via the processor, an optimal process, for forming the product shape from the material shape, from among the plurality of integrated processes on a basis of an actual machining time in each of the integrated processes, a unit integration reduction time that is reduced as one of the toolings of one of the individual processes is integrated, and a number of the individual processes integrated.

* * * * *